March 12, 1963     J. H. CRANKSHAW     3,080,733
MISALIGNMENT COUPLING
Filed Dec. 19, 1960
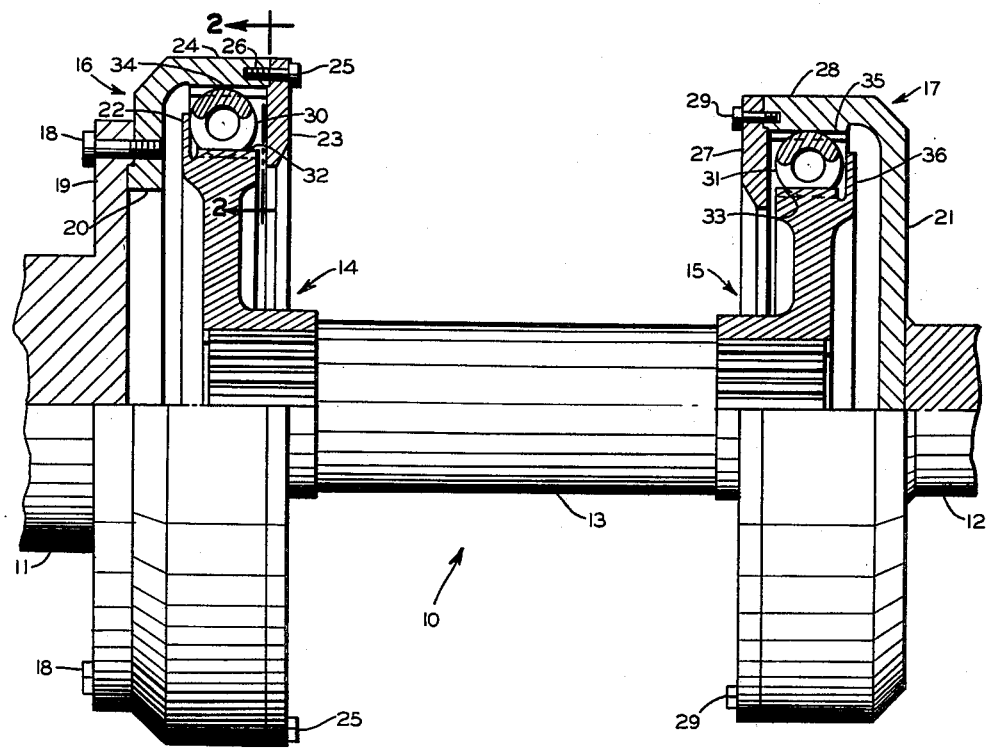
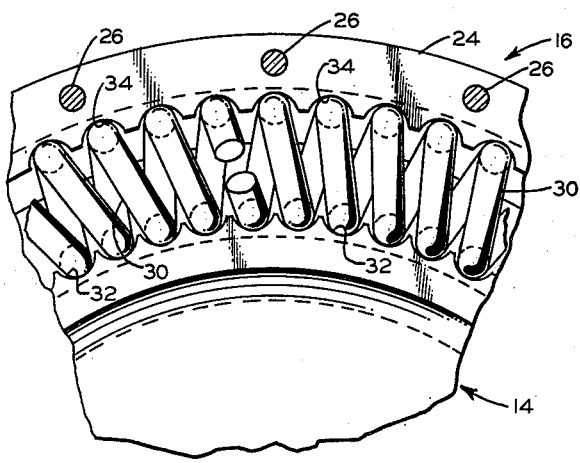
INVENTOR.
JOHN H. CRANKSHAW
BY
*Owen + Owen*
ATTORNEYS

United States Patent Office 3,080,733
Patented Mar. 12, 1963

3,080,733
MISALIGNMENT COUPLING
John H. Crankshaw, Erie, Pa., assignor to Baldwin-Lima-Hamilton Corporation, Philadelphia, Pa., a corporation of Pennsylvania
Filed Dec. 19, 1960, Ser. No. 76,774
8 Claims. (Cl. 64—15)

This invention relates to apparatus for transmitting power between misaligned shafts, and, more particularly, to a misalignment coupling for connecting a shaft that is driven by a prime mover to a shaft that is connected to a power consumer. The misalignment coupling of the invention is particularly useful in marine service where high torques must be transmitted under severe conditions of shaft misalignment.

Misalignment couplings of the prior art have a torque transmitting member, which may be in the form of a sleeve, connected to one of the misaligned shafts and another torque transmitting member, such as a hub, connected to the other misaligned shaft. The hub may be connected to the other misaligned shaft either directly or through an intermediate shaft which is operably connected to the other shaft. Power is transmitted between the torque transmitting members by various means, all of which function to connect these members in driving relation.

One such means utilizes teeth or other force applying elements which are formed on both of the torque transmitting members, and these teeth are maintained in meshing relation to form a positive drive. The contacting surfaces of these force applying elements slide relative to one another during service of the coupling, and the resulting friction produces an undesirable bending moment on each of the connected shafts. This bending moment may cause any gears that are mounted on either of the connected shafts to be misaligned with their mating gears, and this, in turn, results in excessive gear wear.

Various devices have been proposed to eliminate or reduce the effects of this sliding engagement of the force applying elements, and while these devices have been effective to reduce friction, they have usually increased the loading on the individual teeth during services of the coupling. These unequal tooth loadings tend to increase tooth wear which results in expensive replacement of parts.

Flexible means, such as springs, have been proposed for certain couplings to equalize the loading between the teeth and to avoid excessive tooth loadings. Such couplings do not make use of the flexible means as a means for reducing undesirable friction because the springs are loaded in torsional shear which causes the surface of the spring to slide on the surface of the force applying elements.

It has been found, however, that if the flexible means is maintained in compression between properly contoured surfaces on the torque transmitting members, not only is the load equalized because of spring distortion, but also friction is reduced because the motion between the various contacting surfaces of the coupling is limited to rolling engagement. Consequently excessive bending moments on the misaligned shafts are avoided and wear is reduced.

An object of the present invention is to provide a misalignment coupling which will transmit power between misaligned shafts with a minimum of wear and load concentrations when the shafts are either aligned or misaligned, whether the misalignment is parallel offset, or angular, or both.

Another object of the invention is to provide a misaligned coupling having means for distributing the loading on the various parts thereof, even when the misalignment is relatively large.

A further object of the invention is to provide a coupling which will transmit power efficiently between misaligned shafts when the loading is either light or heavy.

Other and more specific objects of the invention will be apparent from the following specification and from the drawings in which like numbers are used throughout to identify like parts.

FIG. 1 is a part axial, part side view of a misalignment coupling made according to the invention; and FIG. 2 is an enlarged partial view in elevation with parts removed, taken from the position indicated by the line 2—2 of FIG. 1.

According to the present invention there is provided a misalignment coupling which comprises an intermediate member, such as a shaft, having a hub mounted on each end thereof. Each hub is receivable in a sleeve, and each sleeve is rigidly mounted on one of the misaligned shafts. While each of the sleeves is rotatable about the axis of its respective shaft, the hubs are rotatable about the axis of the intermediate member.

Resilient means in the form of a helical spring of wire having a circular cross section is interposed between each hub and sleeve for transmitting power therebetween. A plurality of circumferentially spaced recesses is formed on each hub and sleeve, and each of the recesses engages one of the convolutions of the helical spring. The radial distance between the recesses on the hub and the corresponding recesses on the sleeve is less than the free, unrestrained diameter of the spring whereby the spring is maintained in compression and in engagement with the recesses. Also, each recess has a semi-cylindrical surface, the radius of curvature of which is greater than the radius of the wire forming the convolutions of the spring. Because the spring is constantly maintained in compression, the individual convolutions are maintained in their respective recesses and roll therein as the coupling changes its position in response to a misalignment between the shafts and the intermediate member on which the hubs, fore and aft, are carried.

Referring now to the drawings, there is shown in FIG. 1 a misalignment coupling 10 that is used to transmit power between a rotating input shaft 11 which is driven by a prime mover, such as a marine power plant, and a driven output shaft 12 which may, for example, be connected to a propeller or other power consumer. The shafts 11 and 12 are quite large in marine service, and the power transmitted therebetween may be quite high. For example, such shafts may have nominal torque ratings as high as 400,000 foot-pounds, and under certain conditions overload torques of 150 percent of nominal power rating can be expected while the torque may even exceed 200 percent of nominal torque rating under emergency conditions.

The prime mover (not shown) rotates the input shaft 11 about an axis which extends along its centerline while the output shaft 12 is likewise rotatable about a similar axis. In normal service the axes of these shafts are usually misaligned, due to unavoidable inaccuracies, and the misalignment may be parallel offset (where the axes are parallel but offset from one another) or angular (where the axes intersect at an angle to one another). Usually the character of the misalignment of the shafts 11 and 12 combines both parallel offset and angular misalignment. Also the shafts 11 and 12 may be "axially misaligned" in certain installations in which they shift along their axes towards and away from each other during service.

The misalignment coupling 10 of the invention is capable of accommodating combined parallel offset and angular misalignment as well as either type of misalignment individually. Tre coupling 10 comprises an intermediate member such as a shaft 13 located between the input shaft 11 and the output shaft 12 for rotation about its normal axis. The forward hub 14 is mounted on one end of the shaft 13 adjacent the input shaft 11 while a substantially identical hub 15 is mounted on the opposite end of the shaft 13 adjacent the output shaft 12. If desired, the hubs 14 and 15 may be integral with the shaft 13, or they may be made separately and rigidly mounted thereon by an convenient means, such as by spline connections.

The misalignment coupling 10 further comprises a forward sleeve 16 which receives a forward hub 14 and a rear sleeve 17 which receives the driven or aft hub 15. The internal surfaces of the sleeves 16 and 17 are radially spaced from the peripheral surfaces of their respective hubs 14 and 15 to enable the hubs to be skewed relative to the sleeves as the axis of the shaft 13 becomes misaligned with the axes of the shafts 11 and 12 during service of the coupling 10.

The sleeve 16 is secured to the input shaft 11 in any convenient manner; for example, a plurality of bolts 18 which extend through an enlarged end portion 19 on the shaft 11 may be received in an inwardly directed, radially extending flange 20 on the sleeve 16. The sleeve 16 is properly located relative to the axis of the shaft 11 by a pilot portion thereon which engages a mating pilot portion on the enlarged end portion of the shaft 11. If desired, the flange 20 may extend radially inward a sufficient distance to eliminate the enlarged end portion 19, and in such case the flange 20 is secured directly to the end of the shaft 11. Such an arrangement is shown in FIG. 1 wherein the sleeve 17 comprises a substantially flat base 21 that is secured directly to the end of the shaft 12 by any convenient manner, such as by bolting or splines (not shown).

Axial movement of the forward hub 14 as well as the shaft 13 in the direction of the shaft 11 is limited by engagement of the flange 20 with a radially extending shoulder 22 carried by or formed on the hub 14. Axial movement of the hub 14 in the opposite direction is limited by a generally circular retainer 23 which engages an axially extending flange 24 on the sleeve 16. The retainer 23 is removably secured to the sleeve 16 by bolts 25 that are threadably received in holes 26 as illustrated in FIG. 1 and to facilitate assembly and disassembly of the coupling 10.

Axial movement of the aft hub 15 towards the output shaft 12 is limited by the substantially flat base portion 21 of the sleeve 17 while axial movement in the opposite direction is limited by a substantially circular retainer 27 that contacts the sleeve 17. The retainer 27 is removably secured to an axially extending flange 28 on the sleeve 17 by a plurality of bolts 29 to facilitate the assembly and disassembly of the coupling 10.

According to the present invention, a plurality of resilient members 30 is interposed between the hub 14 and the sleeve 16 for transmitting power therebetween while enabling the hubs to be skewed relative to the sleeve. Likewise resilient members 31 are interposed between the hub 15 and the sleeve 17 for the same purpose.

As shown in FIGS. 1 and 2, each resilient member 30 comprises a spring that is coiled in the form of a helix, and the resilient members 31 are of identical construction. The springs 30 and 31 encircle the hubs 14 and 15 and are of the type which comprises convolutions of a wire having a circular cross section. These convolutions of wire are coiled about a centrally disposed axis. While any number of springs may be used, it is preferable to provide at least four of these resilient members between each hub and sleeve. When four springs are used, each has a length substantially equal to one-fourth the circumference of the hub, and it will be appreciated that as the length of each spring decreases a greater number of springs can be used with a maximum number of springs being utilized when each spring comprises a single convolution.

A plurality of axially extending, circumferentially spaced recesses 32 are formed on the peripheral surface of the hub 14 while a plurality of similar recesses 33 are formed on the peripheral surface of the hub 15. These spaced recesses 32 and 33 engage the peripheral surfaces of the springs 30 and 31, and as shown in FIGS. 1 and 2 each recess engages an individual convolution of the adajacent spring. Likewise, a plurality of similar axially extending, circumferentially spaced recesses 34 are formed on the interior of the sleeve 16 which a plurality of identical recesses 35 are formed on the interior of the sleeve 17. The recesses 34 and 35 engage the peripheral surfaces of their respective springs 30 and 31 at points diametrically opposed from the points of contact between the springs and the recesses 32 and 33.

Each of the recesses 32 and 34 has a partially (preferably semi-) cylindrical surface as shown in FIG. 2, and the surfaces of the recesses 33 and 35 are similarly formed. The radius of curvature of the surface of each recess is greater than the radius of the wire which is used to make up the springs 30 and 31; consequently the springs are free to roll in these recesses in a direction transverse to the axes thereof as the coupling 10 revolves. For best results the radius of each recess should be from 1.1 to 1.25 times the radius of the wire from which the spring is wound.

An important feature of the invention is the fact that the spacing between the hubs 14 and 15 and their respective sleeves 16 and 17 is less than the outside diameters of the springs 30 and 31 in a free, unrestrained condition. Consequently the springs 30 and 31 are maintained in radial compression during service to insure contact between the springs and recesses at all times. It has been found that the free diameter of the springs 30 and 31 should exceed the spacing between their respective hubs and sleeves by an amount equal to between 0.0005 inch and 0.0015 inch per inch of spring diameter. The amount of this excess and consequently the amount each spring is compressed is dependent upon the ratio of the spring wire diameter to the pitch diameter of the spring coil.

The convolutions of the springs 30 and 31 may also roll axially along their respective recesses as the hubs 14 and 15 become skewed relative to the sleeves 16 and 17. This axial rolling of the forward coupling spring 30 is limited by the shoulder 22 and the retainer 23 while the axial rolling of the aft coupling spring 31 is limited by the retainer 27 and a shoulder 36 on the hub 15.

While the preferred embodiment of the invention has been shown and described, it should be expressly understood that modifications and changes may be made without departing from the invention as defined in the appended claims.

I claim:

1. A misalignment coupling for transmitting power between a pair of shafts having misaligned axes, said coupling comprising an intermediate member interposed between the misaligned shafts and rotatable about its normal axis, first coupling members mounted on the opposite ends of said intermediate member for rotation about said normal axis, second coupling members connected to the misaligned shafts, said second coupling members being spaced from said first coupling members in a radial direction outward from the normal axis of said intermediate member, and circumferentially extending coiled resilient members interposed between said first and second coupling members for transmitting power therebetween, said first and second coupling members having a plurality of axially extending recesses for engaging each of the coils of said resilient members, the radial spacing between said recesses being less than the unrestrained diameter of said coils to maintain each of said resilient members in radial compression.

2. A misalignment coupling for transmitting power between a pair of shafts having misaligned axes, said coupling comprising an intermediate member interposed between the misaligned shafts and rotatable about its normal axis, first coupling members mounted on the opposite ends of said intermediate member for rotation about said normal axis, second coupling members connected to the misaligned shafts, said second coupling members being spaced from said first coupling members in a radial direction outward from the normal axis of said intermediate member, and a plurality of helical springs of the type comprising convolutions of a cylindrical wire, said helical springs being interposed between said first and second coupling members for transmitting power therebetween, said first and second coupling members having a plurality of recesses for engaging each of said convolutions, the radial spacing between said recesses being less than the unrestrained diameter of said convolutions to maintain each of said helical springs in radial compression, each of said recesses having a semi-cylindrical surface, the radius of curvature of said surface being greater than the radius of the cylindrical wire whereby said convolutions roll in said recesses as the misalignment coupling changes its position in response to a misalignment between the shafts and said intermediate member.

3. Apparatus as claimed in claim 2, wherein the radius of curvature of said semi-cylindrical surface is between 1.1 and 1.25 times the radius of the cylindrical wire.

4. In a misalignment coupling of the type comprising a first coupling member connected to one shaft and a second coupling member spaced therefrom connected to another shaft for transmitting power therebetween when the shafts are misaligned; the improvement comprising a circumferentially extending resilient member interposed between the first and second coupling members, said resilient member being helically coiled along its axis, and axially extending recesses formed on both the first and second coupling members for engaging the individual coils of said spring, the spacing between corresponding, facing recesses on the first and second members being less than the free diameter of said spring normal to said axis whereby said spring is maintained in radial compression between the members.

5. In a misalignment coupling of the type comprising a first coupling member connected to one shaft and the second coupling member spaced therefrom connected to another shaft for transmitting power therebetween when the shafts are misaligned; the improvement comprising a helical spring of the type comprising convolutions of a cylindrical wire interposed between the first and second coupling members, and recesses formed on both the first and second coupling members for engaging each of said convolutions, the spacing between the corresponding, facing recesses on the first and second members being less than the free diameter of said spring normal to said axis whereby said spring is maintained in radial compression between the members, each of said recesses having a semi-cylindrical surface, the radius of curvature of said surface being greater than the radius of the cylindrical wire whereby said convolutions roll in said recesses as the coupling changes position in response to a misalignment between the shafts.

6. Apparatus as claimed in claim 5, wherein the radius of curvature of said semi-cylindrical surface is between 1.1 and 1.25 times the radius of the cylindrical wire.

7. A misalignment coupling for transmitting power between a pair of shafts having misaligned axes, said coupling comprising an intermediate member interposed between the misaligned shafts and rotatable about its normal axis, first coupling members mounted on the opposite ends of said intermediate member for rotation about said normal axis, second coupling members connected to the misaligned shafts, said second coupling members being spaced from said first coupling members in a radial direction outward from the normal axis of said intermediate member, and a plurality of helical springs of the type comprising convolutions of a cylindrical wire, said helical springs being interposed between said first and second coupling members for transmitting power therebetween, said first and second coupling members having a plurality of recesses for engaging each of said convolutions, each of said recesses having a semi-cylindrical surface, the radius of curvature of said surface being greater than the radius of the cylindrical wire whereby said convolutions roll in said recesses as the misalignment coupling changes its position in response to a misalignment between the shafts and said intermediate member.

8. In a misalignment coupling of the type comprising a first coupling member connected to one shaft and the second coupling member spaced therefrom connected to another shaft for transmitting power therebetween when the shafts are misaligned; the improvement comprising a helical spring of the type comprising convolutions of a cylindrical wire interposed between the first and second coupling members, and recesses formed on both the first and second coupling members for engaging each of said convolutions, each of said recesses having a semi-cylindrical surface, the radius of curvature of said surface being greater than the radius of the cylindrical wire whereby said convolutions roll in said recesses as the coupling changes position in response to a misalignment between the shafts.

References Cited in the file of this patent

UNITED STATES PATENTS

| 1,940,884 | Rosenberg | Dec. 26, 1933 |
| 2,096,039 | Higgins | Oct. 19, 1937 |
| 2,119,678 | Linder | June 7, 1938 |

FOREIGN PATENTS

| 22,605 | Great Britain | Oct. 7, 1913 |
| 247,716 | Great Britain | Feb. 25, 1926 |
| 441,425 | Germany | Mar. 3, 1927 |
| 57,041 | France | Aug. 6, 1952 |

(2nd addition to No. 994,045)